(12) United States Patent
Wilson et al.

(10) Patent No.: US 12,049,916 B2
(45) Date of Patent: Jul. 30, 2024

(54) SPRING NUT

(71) Applicant: ERICO International Corporation, Solon, OH (US)

(72) Inventors: Eric J. Wilson, Solon, OH (US); Raymond Olle, Valley View, OH (US); Scott Laughlin, Middlefield, OH (US); David Landphair, Kernersville, NC (US)

(73) Assignee: ERICO International Corporation, Solon, OH (US)

( * ) Notice: Subject to any disclaimer, the term of this patent is extended or adjusted under 35 U.S.C. 154(b) by 185 days.

(21) Appl. No.: 17/592,696

(22) Filed: Feb. 4, 2022

(65) Prior Publication Data

US 2022/0252101 A1 Aug. 11, 2022

Related U.S. Application Data

(60) Provisional application No. 63/146,432, filed on Feb. 5, 2021.

(51) Int. Cl.
*F16B 39/00* (2006.01)
*F16B 37/08* (2006.01)

(52) U.S. Cl.
CPC ...... *F16B 37/0857* (2013.01); *F16B 37/0842* (2013.01)

(58) Field of Classification Search
CPC .............. F16B 37/0857; F16B 37/0842; F16B 37/046; F16B 37/045; F16B 37/043; F16B 37/02

USPC ......................................................... 411/170
See application file for complete search history.

(56) References Cited

U.S. PATENT DOCUMENTS

| | | | |
|---|---|---|---|
| 3,374,979 | A | 3/1968 | Coldren et al. |
| 3,375,749 | A | 4/1968 | Coldren et al. |
| 3,752,032 | A | 8/1973 | Fiddler |
| 4,666,355 | A | 5/1987 | Stover |
| 4,729,706 | A | 3/1988 | Peterson et al. |
| 4,897,005 | A | 1/1990 | Peterson et al. |

(Continued)

FOREIGN PATENT DOCUMENTS

| | | |
|---|---|---|
| CN | 205136321 U | 4/2016 |
| CN | 207093546 U | 3/2018 |

(Continued)

*Primary Examiner* — Gary W Estremsky
(74) *Attorney, Agent, or Firm* — Quarles & Brady LLP

(57) ABSTRACT

A spring nut for attaching a threaded object to a structure with reentrant lips. The spring nut can include a base, a first arm and a second arm extending from the base in a first direction, and legs extending laterally from the base. The arms can include a support portion, a structure-engagement portion, and a thread-engagement portion that can be configured to secure the threaded object against axial loading in a second direction opposite the first direction. Crumple zones in the support portions can deform upon loading of the threaded object in the second direction to cause the structure-engagement portion to be urged into the reentrant lips. Each of the legs can extend at a first angle from the base, toward the structure-engagement portions, to be disposed to contact an exterior surface of the reentrant lips of the structure when the first and second arms are received in the channel.

19 Claims, 12 Drawing Sheets

(56) References Cited

U.S. PATENT DOCUMENTS

| | | |
|---|---|---|
| 4,919,580 A | 4/1990 | Wright |
| 4,925,351 A | 5/1990 | Fisher |
| 5,067,863 A | 11/1991 | Kowalski |
| 5,211,521 A | 5/1993 | Page |
| 6,164,885 A | 12/2000 | Roytberg et al. |
| 6,283,689 B1 | 9/2001 | Roytberg et al. |
| 6,837,661 B2 | 1/2005 | Schwarz et al. |
| 7,086,125 B2 | 8/2006 | Slobodecki et al. |
| 7,090,174 B2 | 8/2006 | Korczak et al. |
| 7,568,870 B2 | 8/2009 | Paquet |
| 7,789,606 B2 | 9/2010 | Kosidlo, IV et al. |
| 7,874,775 B2 | 1/2011 | Hullmann et al. |
| 7,905,694 B2 | 3/2011 | van Walraven |
| 8,240,964 B2 * | 8/2012 | Motsch ............... F16B 37/043 411/173 |
| 8,721,247 B2 | 5/2014 | Spitz |
| 8,790,056 B2 * | 7/2014 | Fuentes Domingo .. F16B 37/02 411/173 |
| 8,794,895 B2 | 8/2014 | Homner et al. |
| 8,959,730 B2 | 2/2015 | Hemingway et al. |
| 9,347,213 B1 | 5/2016 | Zhang et al. |
| 9,453,592 B2 | 9/2016 | Zhang et al. |
| 9,470,339 B2 | 10/2016 | Zhang et al. |
| 9,562,554 B2 * | 2/2017 | Vidal ..................... F16B 37/02 |
| 9,580,900 B2 | 2/2017 | Zhang et al. |
| 9,587,767 B2 | 3/2017 | Zhang et al. |
| 9,631,662 B2 | 4/2017 | Boyer et al. |
| 9,651,171 B2 | 5/2017 | Zhang et al. |
| 9,746,105 B2 | 8/2017 | Zhang et al. |
| 9,982,837 B2 | 5/2018 | Zhang et al. |
| 10,161,127 B2 | 12/2018 | Zhang et al. |
| 10,408,252 B2 | 9/2019 | Reznar et al. |
| 10,590,981 B2 | 3/2020 | Davidson et al. |
| 10,619,791 B2 | 4/2020 | Zhang et al. |
| 11,199,216 B2 | 12/2021 | Buczynski |
| 2002/0054808 A1 | 5/2002 | Vassiliou |
| 2003/0185643 A1 | 10/2003 | Thompson |
| 2005/0220563 A1 | 10/2005 | Kosidlo, IV et al. |
| 2005/0246871 A1 | 11/2005 | Lubera et al. |
| 2006/0249633 A1 | 11/2006 | Korczak et al. |
| 2008/0226417 A1 | 9/2008 | Spitz |
| 2010/0026028 A1 * | 2/2010 | Smith ................... F16B 37/043 296/29 |
| 2012/0125960 A1 * | 5/2012 | Diez Herrera ........ F16B 37/043 224/309 |
| 2013/0287521 A1 * | 10/2013 | Benedetti .............. F16B 5/0642 24/458 |
| 2015/0267734 A1 * | 9/2015 | Boyer ..................... F16B 37/02 411/520 |
| 2016/0115987 A1 * | 4/2016 | Kwon .................... E05B 79/06 248/27.3 |
| 2016/0252127 A1 * | 9/2016 | Hattori ................... F16B 37/02 411/523 |
| 2016/0355144 A1 * | 12/2016 | Horneck ............ B60R 13/0206 |
| 2018/0335072 A1 | 11/2018 | Wilson et al. |
| 2018/0347614 A1 * | 12/2018 | Reznar .................. F16B 37/046 |
| 2019/0338803 A1 | 11/2019 | Buczynski |
| 2019/0383318 A1 | 12/2019 | Buczynski et al. |
| 2020/0240455 A1 | 7/2020 | Davidson et al. |
| 2020/0347871 A1 | 11/2020 | Wilson et al. |
| 2021/0054867 A1 * | 2/2021 | Buczynski ............ F16B 37/043 |
| 2021/0062855 A1 * | 3/2021 | Buczynski ............ F16B 37/043 |
| 2022/0099123 A1 | 3/2022 | Juzak et al. |

FOREIGN PATENT DOCUMENTS

| | | |
|---|---|---|
| DE | 20104604 U1 | 8/2002 |
| DE | 102018206849 A1 | 11/2019 |
| EP | 0351293 A1 | 1/1990 |
| EP | 0671581 A2 | 9/1995 |
| EP | 0907032 B1 | 6/2002 |
| EP | 1460281 A1 | 9/2004 |
| EP | 2916017 B1 | 6/2017 |
| WO | 2017/008958 A1 | 1/2017 |

\* cited by examiner (REFERENCE ART)

(REFERENCE ART)

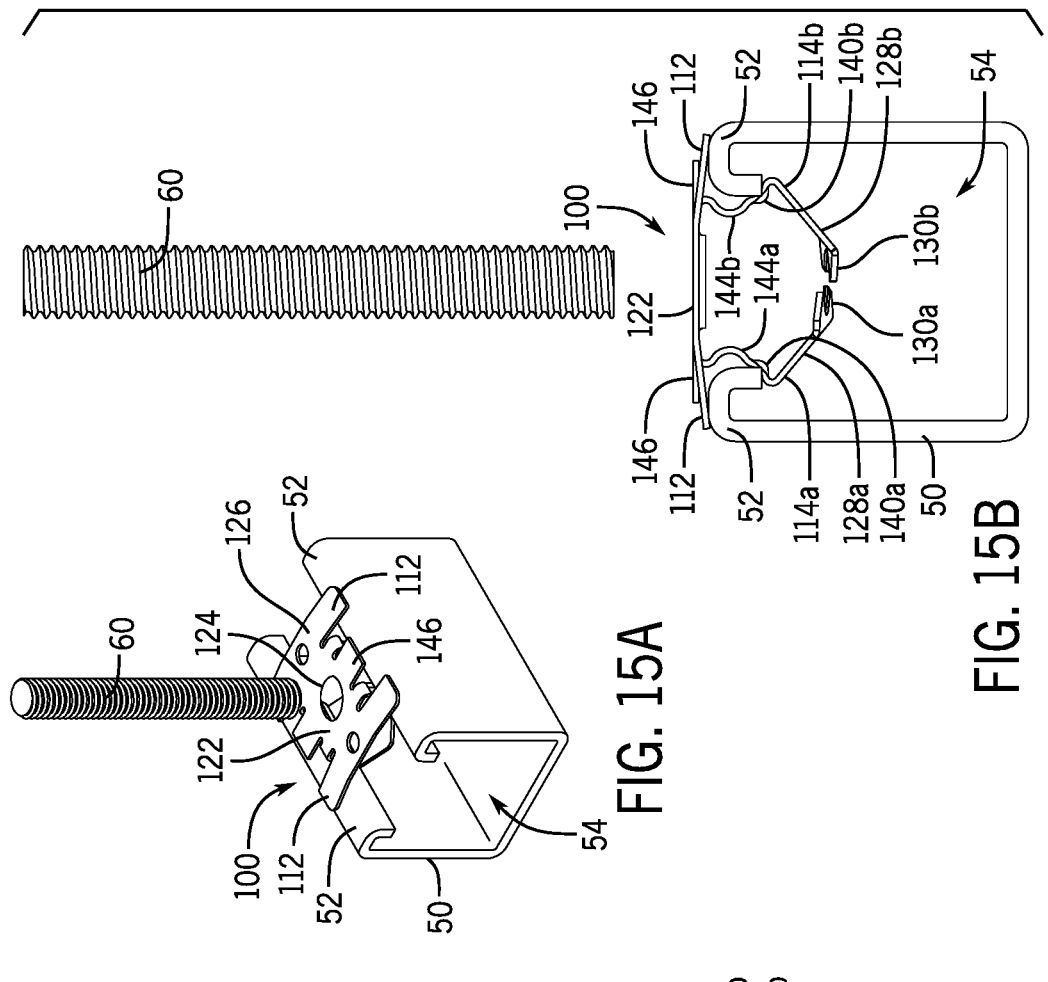
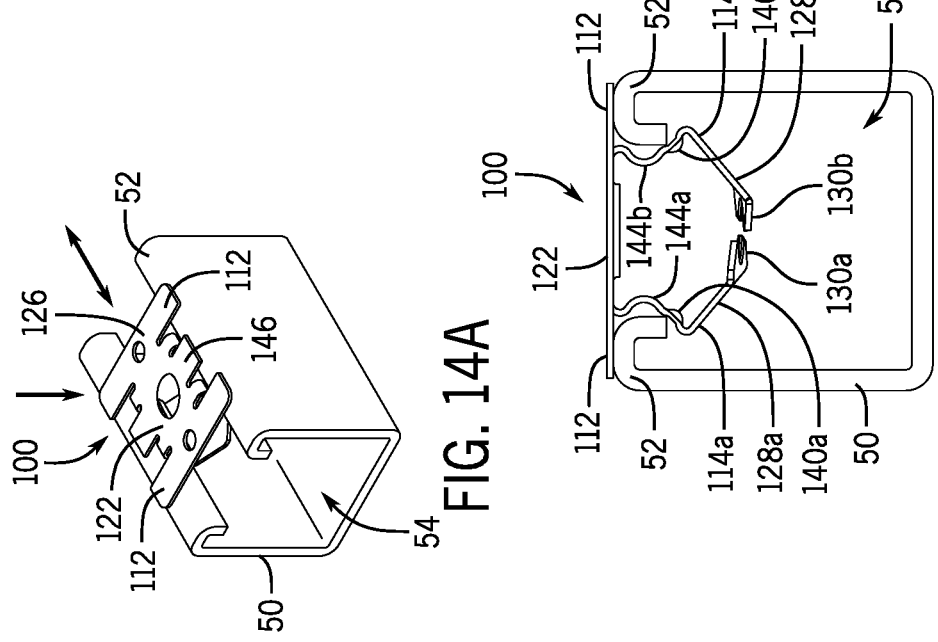

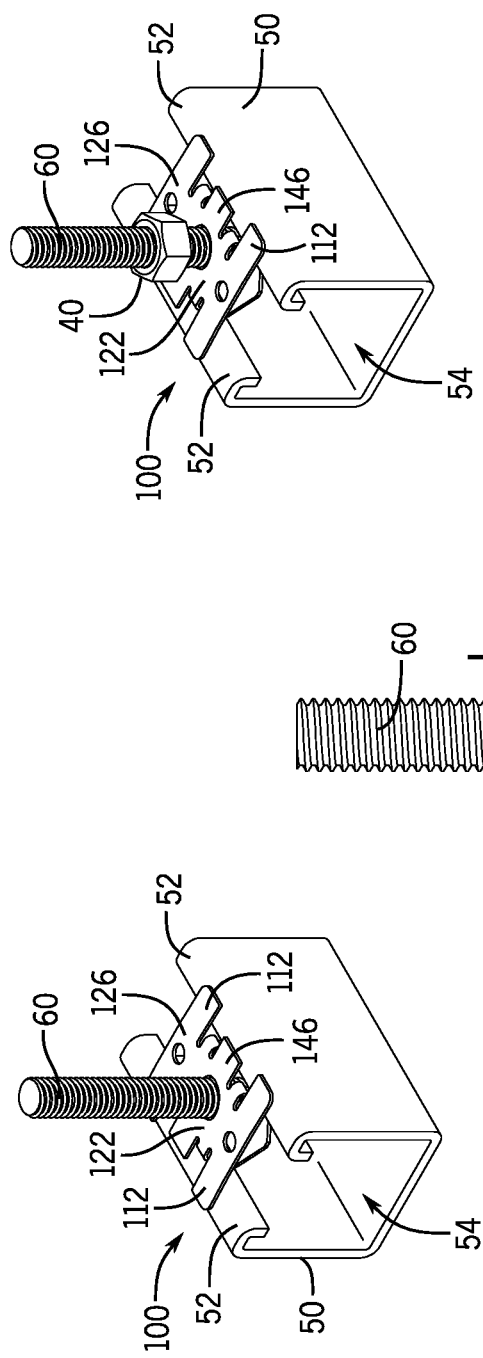
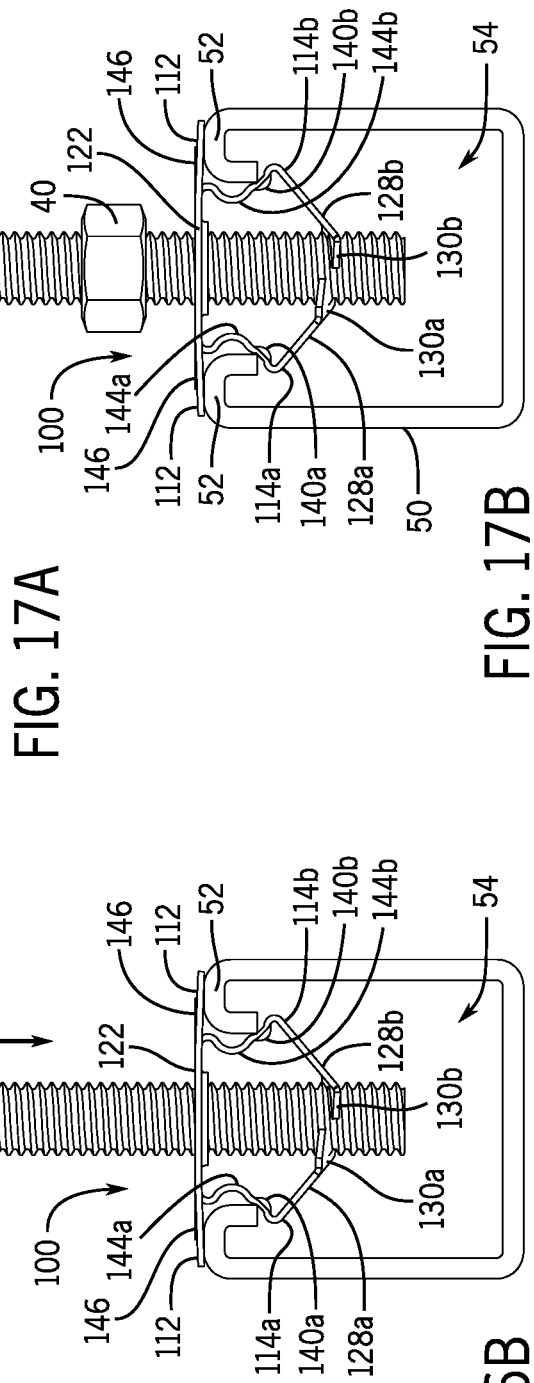
FIG. 16A
FIG. 16B
FIG. 17A
FIG. 17B

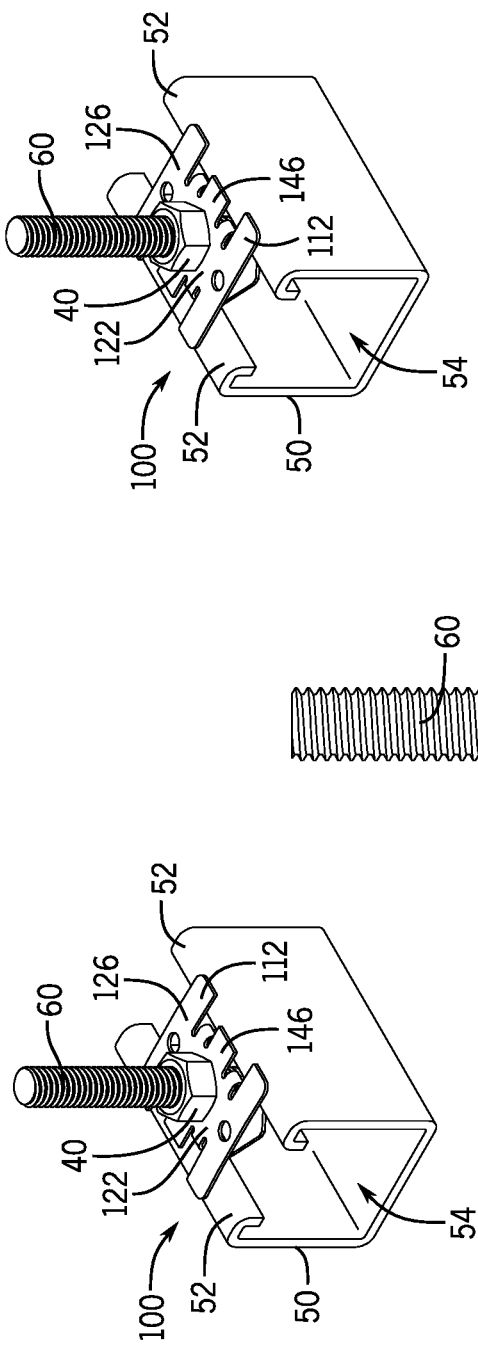
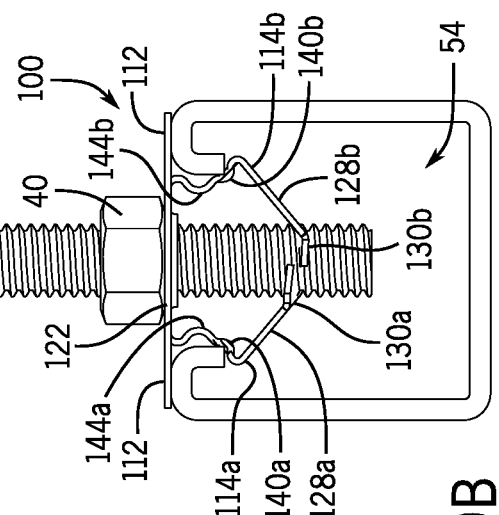
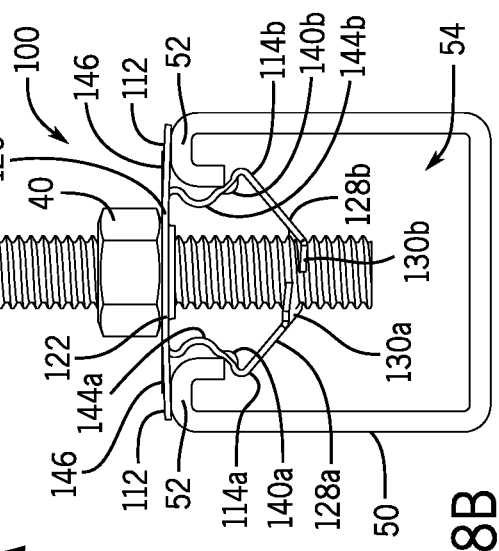

SPRING NUT

CROSS-REFERENCE TO RELATED APPLICATIONS

This application claims priority under 35 U.S.C. 119 from U.S. Provisional Application No. 63/146,432, filed Feb. 5, 2021, entitled "Spring Nut," and is incorporated herein by reference in its entirety.

BACKGROUND

In many applications, it may be useful to quickly attach a nut to a threaded object, in order to use the nut and the threaded object to support other structures. For example, it may be useful to attach a nut to a threaded rod to quickly attach the threaded rod to a structure or to suspend a load.

SUMMARY

Some embodiments of the invention provide a spring nut for attaching a threaded object to a structure with reentrant lips and a channel. The spring nut can include a base, a first arm extending from the base in a first direction, a second arm extending in the first direction from the base opposite the first arm, and legs extending laterally from the base, in opposing directions, beyond the first and second arms. Each of the first and second arms can include a support portion that extends from the base, a structure-engagement portion that extends laterally outwardly from the support portion to be disposed to engage a reentrant lip of the structure, and a thread-engagement portion that extends laterally inwardly from the structure-engagement portion to secure the threaded object against axial loading in a second direction opposite the first direction. The support portions of each of the first and second arms can include a crumple zone that can be configured to deform upon loading of the threaded object in the second direction to decrease a distance between the base and the thread-engagement portion of the respective first or second arm to cause the structure-engagement portion to be urged into the reentrant lips. Each of the legs can extend at a first angle from the base, toward the structure-engagement portions, to be disposed to contact an exterior surface of the reentrant lips of the structure when the first and second arms are received in the channel.

In some embodiments, the first and second arms can be configured to flex laterally inwardly as the first and second arms are urged past the reentrant lips of the structure and then resiliently spring laterally outwardly, so that the structure-engagement portions are disposed to seat against the reentrant lips. With the first and second arms extending into the channel of the structure, the first and second arms can flex laterally outwardly to admit the threaded object therebetween in thread-engagement portions upon non-rotational insertion of the threaded object in the first direction. The first and second arms can also resiliently spring laterally inwardly to engage the thread-engagement portions with a thread of the threaded object, to secure the threaded object against non-rotational movement of the threaded object opposite the first direction.

In some embodiments, the structure-engagement portion can include engagement gussets arranged to direct spring energy of the first and second arms onto a focused location of a corresponding one of the reentrant lips of the structure. The legs can be configured to induce a spring force in the second direction onto the reentrant lips to engage the engagement gussets with the reentrant lips. The base can be a planar body that defines a base plane, and the legs can be planar legs that extend obliquely away from the base plane.

In some embodiments, the structure-engagement portions can be configured to engage the reentrant lips to resist sliding adjustment of the spring nut relative to the structure. From the first installed configuration, with the first and second arms received in the channel, the legs can be configured to be elastically deformed by a force that urges the base toward the structure, to extend at a second angle from the base that is different from the first angle, so that the engagement features of the structure-engagement portions disengage from the reentrant lips to permit sliding adjustment of the spring nut relative to the structure.

In some embodiments, one or more of the crumple zones can be formed as a curved section of the respective support portion, including a C-shaped profile. Each of the support portions can include an S-shaped profile that extends between the base and the engagement feature and can include the C-shaped profile of the crumple zone.

In some embodiments, the spring nut can also include stop tabs extending outward from the base adjacent the first and second arms. The stop tabs can be configured to contact an exterior surface of the reentrant lips of the structure to provide a stop against over-insertion of the first and second arms into the channel of the structure. The stop tabs can extend along a base plane defined by the base, separately from the legs.

In some embodiments, the engagement features can include engagement gussets. For each of the first and second arms the crumple zone can be located between the base and the engagement gusset.

Some embodiments of the invention provide a spring nut for attaching a threaded object to a strut with a channel and reentrant lips. The spring nut can include a base, a first arm integrally extending from the base, a second arm integrally extending from the base opposite the first arm and configured to engage the threaded object in combination with the first arm, and legs integrally extending from the base. The first and second arms can define a first width in a first lateral direction and the legs can define a second width in the first lateral direction that is larger than the first width. The legs can be disposed at an angle relative to the base to extend in a direction toward structure-engagement portions of the first and second arms. The legs can be configured to contact an exterior surface of the reentrant lip when installed on the strut. The first and second arms can be configured to induce a spring force in a first and second direction, respectively, into the respective reentrant lip to engage the structure-engagement portions with the reentrant lips. The legs can be configured to induce a spring force in a third direction onto the reentrant lips, outside the channel of the strut, to engage the structure-engagement portions with the reentrant lips.

In some embodiments, the spring nut can include stop tabs extending outward from the base adjacent the first and second arms, between corresponding sets of the legs. The stop tabs can be configured to contact an exterior surface of the reentrant lips of the structure to provide a stop against over-insertion of the first and second arms within the strut.

In some embodiments, each of the first and second arms can include a crumple zone that is movable during installation, upon loading of the threaded object in a direction away from the strut, between an installation configuration and an installed configuration that is at least partially collapsed relative to the installation configuration. Further, one or more of the crumple zones can include in an S-curve region of the respective first or second arm that extends from the crumple zone to the base.

Other embodiments of the invention can provide a spring nut for attaching a threaded object to a strut with first and second reentrant lips. The spring nut can include a base with an aperture that defines a base plane; a set of arms, including a first arm that extends from a first side of the base and a second arm that extends from a second side of the base opposite the first side; and a set of legs extending from the base, obliquely relative to the base plane, including a first leg that extends from the first side of the base in a direction toward the first arm and a second leg that extends from the second side of the base in a direction toward the second arm. The first and second arms can be laterally spaced relative to a central axis on which the aperture is centered. The first and second arms can be configured to biasingly engage the first and second reentrant lips, respectively, internal to the strut. Further, the set of legs can be configured to biasingly engage the first and second reentrant lips external to the strut to further urge the first and second arms into engagement with the first and second reentrant lips.

In some embodiments, the set of legs can further include a third leg extending from the first side of the base, parallel with and on an opposing side of the first arm from the first leg, and a fourth leg extending from the second side of the base, parallel with and on an opposing side of the second arm from the second leg. In some embodiments, a portion of each of the first and second arms that extends laterally outwardly from the base can include a crumple zone. The crumple zone can be configured to at least partially collapse when the first and second arms are engaged with the first and second reentrant lips and the threaded object is loaded against the first and second arms to shorten a distance between the base and a distal end of the respective first or second arm that engages the threaded object. In some embodiments, the crumple zone can be included in an S-curve region of the respective first or second arm that extends between the base and a strut-engagement portion of the first or second arm that is configured to engage the corresponding first or second reentrant lip to secure the spring nut against sliding along the strut.

In some embodiments, each of the first and second arms can include an engagement gusset with an edge profile configured to engage the corresponding first or second reentrant lip.

In some embodiments, the spring nut can further include a set of stop tabs extending from the base and along the base plane. The stop tabs can be configured to contact exterior surfaces of the first and second reentrant lips to provide a stop for insertion of the spring nut into the strut.

DESCRIPTION OF THE DRAWINGS

FIGS. 12A through 19B provide views of an installation process for the spring nut of FIG. 3.

DETAILED DESCRIPTION

Figure 1:
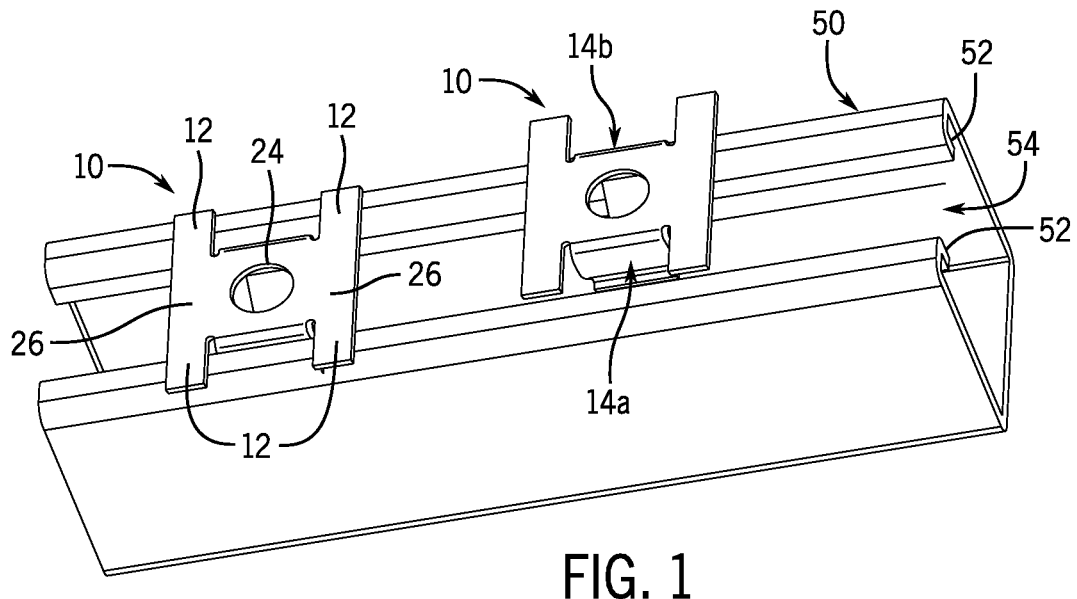
FIG. 1 is an isometric view of instances of a spring nut installed, and being installed, on a strut.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, the term "axial" (and the like) in the context of push-on spring nuts generally refers to a direction of insertion of a threaded object, such as the axial direction of an elongate threaded rod. Similarly, the term "lateral" (and the like) in the context of push-on spring nuts generally refers to a direction at least a component of which extends perpendicularly relative to the axial direction. In this regard, lateral directions or movements can include, but are not limited to, radial directions or movements.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In the discussion below, various examples describe spring nuts for attaching to a threaded object (e.g., a threaded rod) to a structure (e.g., a strut) and suspending a load. It will be understood that the attachment to a strut and a threaded rod described are presented as examples only and that the disclosed spring nut can be used to attach to other devices, such as threaded fasteners or other threaded objects, or other objects generally.

Some embodiments of the invention can provide spring nuts with improved retention strength as compared to conventional designs. For example, in some embodiments of the invention, resilient arms can include support portions that connect to a spring-nut base, with structure-engagement portions extending laterally outwardly from the support portions. Further, connecting portions can extend at acute angles laterally inwardly from the structure-engagement portions to thread-engagement portions that are configured to engage the thread of a threaded object. Usefully, the laterally outward extension of the structure-engagement portions can position the structure-engagement portions to engage a structure near openings through which the spring nuts are inserted, in order to secure the spring nuts to relevant structures. Additionally, the combined structure of the laterally outwardly extending structure-engagement portions and the laterally inwardly extending connecting portions can contribute to a favorable balance of forces upon axial loading of a threaded object held by a spring nut according to the invention, which can result in increasingly firm attachment of the spring nut to the threaded object as the loading on the threaded object increases.

In some embodiments, arms of a spring nut, such as described above, can be formed as continuous features. For example, an arm of a spring nut can extend continuously from a base along a support portion, then along a connecting portion, then along a thread-engagement portion to a free end configured to engage the thread of a threaded object. This may be useful, for example, in order to simplify manufacturing of the relevant spring nut, while also potentially increasing the strength of the spring nut for a given material thickness.

In some embodiments, spring nuts according to the invention can include a biasing feature configured to further enhance engagement between the spring nut and a strut. For example, legs can be provided that extend at an angle relative to the base of the spring nut, which can induce a biasing force against an exterior surface of a reentrant lip of the strut to urge a structure-engagement portion into contact with an interior edge of the reentrant lip. In some embodiments, these or other legs can be configured to be selectively flexed to partially release a spring nut for sliding adjustment along a strut.

In some embodiments, spring nuts according to the invention can include an engagement feature configured to further enhance engagement between the spring nut and a strut. For example, an engagement gusset (e.g., a coined region) can be provided on a structure-engagement portion of the spring nut. The engagement gusset can include an edge, which focuses the spring energy of the arms of the spring nut on a reentrant lip of the strut. As another example, an engagement feature can include a crumple zone in a support portion of the spring nut that is generally configured to partially crumple (i.e., collapse), as a threaded rod is tightened or loaded within the spring nut. This can allow the structure-engagement portion to better engage with the reentrant lip. The crumple zone can be formed as a curved section of the support portion in some cases.

Figure 2:
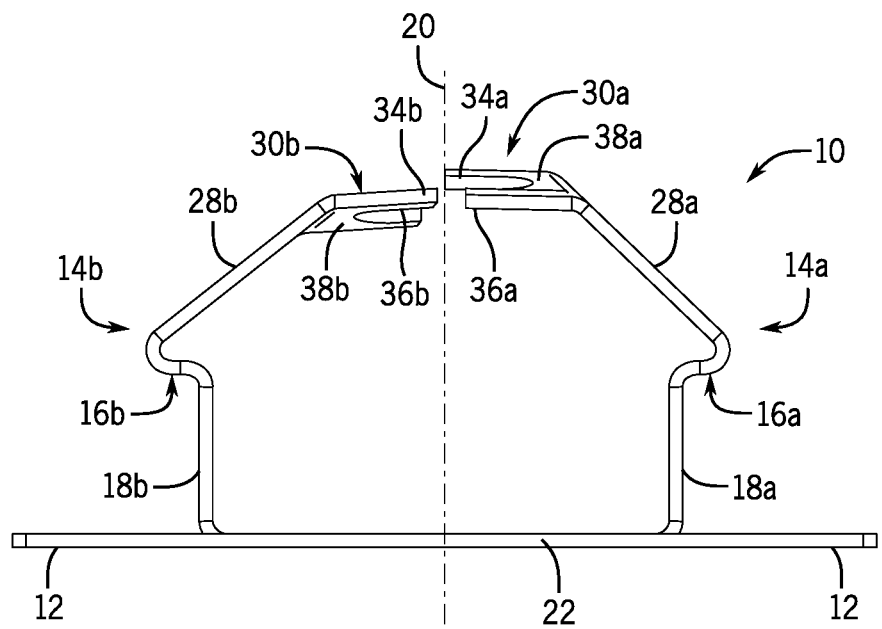
FIG. 2 is a front elevation view of the spring nut insert of FIG. 1.
Figure 3:
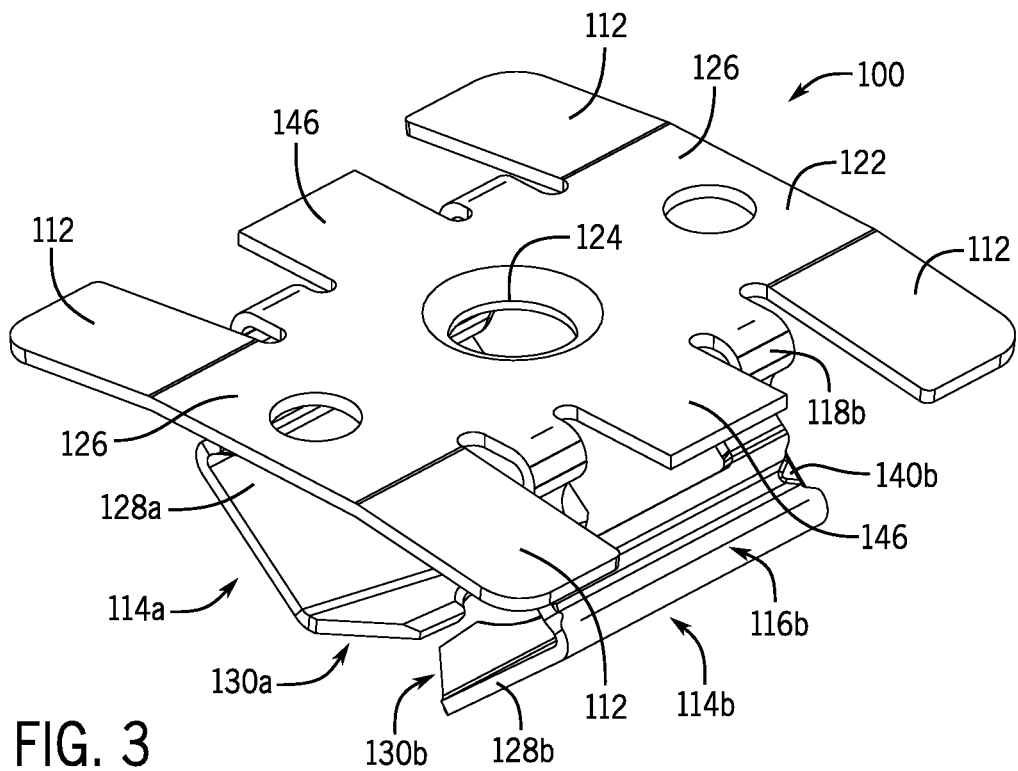
FIG. 3 is a bottom, front, left isometric view of a spring nut according to an embodiment of the invention.
Figure 4:
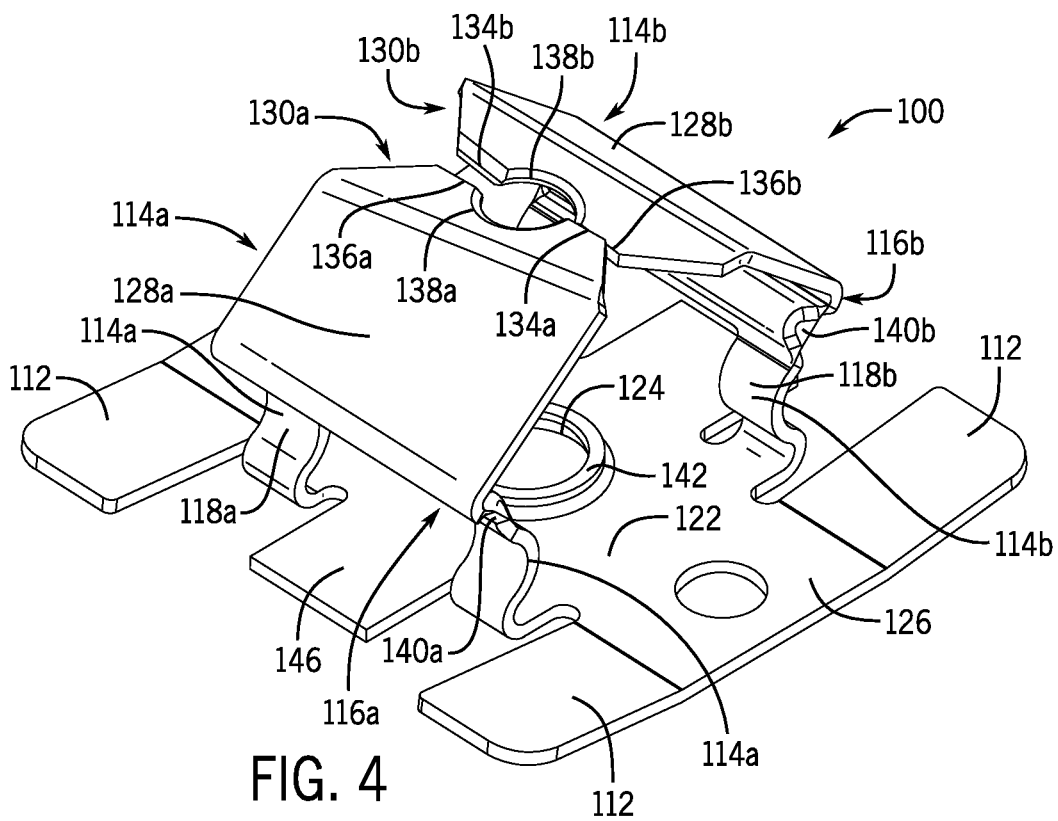
FIG. 4 is a top, rear, right isometric view of the spring nut of FIG. 3.

As illustrated in FIGS. 1 and 2, an example spring nut 10 as described in Applicant's U.S. Published Application number 2018/0335072, published on Nov. 22, 2018, herein incorporated by reference in its entirety, generally includes an insert base 22, and opposing first and second arms 14a, 14b, and defines a central axis 20. In the example illustrated, the first arm 14a is generally similar to the second arm 14b. Therefore, discussion of the first arm 14a herein also generally applies to the second arm 14b. For clarity, in FIGS. 1 and 2, similar features on the first and second arms 14a, 14b are generally identified using like references numerals, with the suffix "a" denoting components on the first arm 14a and the suffix "b" denoting components on the second arm 14b.

In the example illustrated, the first arm 14a is formed integrally with and extends from a side of the insert base 22, via a first straight-walled support portion 18a. The support portion 18a, which is arranged substantially perpendicular to the base 22, extends axially between the base 22 and a support and thread-engaging end of the first arm 14a. In particular, for example, the first arm 14a generally includes a first structure-engagement portion 16a that extends from the support portion 18a. The first arm 14a also includes a first angled connecting portion 28a extending from the first structure-engagement portion 16a opposite the support portion 18a, and a first thread-engaging end 30a extending from the first connecting portion 28a opposite the first structure-engagement portion 16a. The first thread-engaging portion 30a has a first leading edge 34a being arranged axially higher than a first trailing edge 36a (i.e., axially farther from the base 22 than the first trailing edge 36a) at opposite ends of a curved edge 38a. Similarly, the second thread-engaging portion 30b has a second leading edge 34b being arranged axially higher than a second trailing edge 36b at opposite ends of a curved edge 38b.

Accordingly, in the example illustrated, the first structure-engagement portion 16a defines a two-bend profile that extends laterally outward at an approximately 90-degree junction between the first structure-engagement portion 16a and the first straight-walled support portion 18a, and then laterally inward and axially upward at an acutely angled junction between the first structure-engagement portion 16a and the first connecting portion 28a.

Correspondingly, in the example illustrated, the first angled connecting portion 28a extends axially away from the first structure-engagement portion 16a and laterally inward toward the central axis 20 at an angle between zero and ninety degrees defined between the first angled connecting portion 28a and the central axis 20. The first thread-engaging end 30a then extends laterally inwardly from the first angled connecting portion 28a, from a junction that is opposite the junction between the first angled connection portion 28a and the first structure-engagement portion 16a and in substantial axial alignment with the junction between the first structure-engagement portion 16a and the first straight-walled support portion 18a. This may be useful during installation and loading of the insert 10, for example, as further described below.

Continuing, the base 22 of the spring nut 10 extends perpendicularly to the central axis 20. Correspondingly, an aperture 24 through the base 22 is axially aligned with curved edges 38a, 38b of the arms 14a, 14b so that, for example, a threaded rod can be inserted axially through the aperture 24 and between the curved edges 38a, 38b. Further, the base 22 includes opposing tabs 26, which extend outside of the axially projected envelope of the arms 14a, 14b. Each of the tabs 26 includes a set of opposing legs 12 that extend laterally substantially beyond the arms 14a, 14b.

Looking at FIG. 1, the spring nut 10 is shown installed directly onto a strut 50. The strut 50 has reentrant lips 52 separated by a central channel 54. During installation on the strut 50 the arms 14a, 14b can resiliently spring laterally outwardly within the strut 50, so that the structure-engagement portions 16a, 16b engage an interior side of each of the reentrant lips 52 to secure the spring nut 10 against axial withdrawal from the strut 50. Similarly, the legs 12 extend across the exterior side of the reentrant lips 52, to secure the spring nut 10 against over-insertion into the strut 50.

In this way, for example, the structure-engagement portions 16a, 16b and the tabs 26 can cooperate to secure the spring nut 10 within the channel 54. The arms 14a, 14b may still be free to flex resiliently (e.g., at the junction between the structure-engagement portions 16a, 16b and the connecting portions 28a, 28b) in order to receive and secure a threaded object (not shown in FIG. 1) that is inserted axially and non-rotationally through the aperture 24.

FIGS. 3 through 6 illustrate a push-on spring nut 100 according to an embodiment of the invention. In some embodiments, the spring nut 100 is provided as a unitary, one-piece, construction. In some embodiments, the spring nut 100 is configured to be received and retained by a strut (see FIG. 1) similarly to the example spring nut 10, and to be attached to a threaded object, such as a threaded rod 60 (see FIGS. 7 through 10), to support various structures. For example, the spring nut 100 can be attached to the threaded rod 60 to allow for quick coupling to a structure or load. In some embodiments, for example, the spring nut 100 can be used to suspend a conduit, a pipe, a duct, or another structure. In some embodiments, the spring nut 100 can be used in other settings. In some embodiments, the spring nut 100 can be unitarily formed from a single piece of material. In some embodiments, the spring nut 100 can be fabricated from a metal material (e.g., mild steel or spring steel).

In the illustrated embodiment, the spring nut 100 includes opposing arms 114 (individually, 114a, 114b) that are designed to be resiliently flexible (e.g., in axial and lateral directions). For clarity, in FIGS. 3 through 11, similar features on the first and second arms 114a, 114b are generally identified using like references numerals, with the suffix "a" denoting components on the first arm 114a and the suffix "b" denoting components on the second arm 114b. In some embodiments, the arms 114 can be flexible enough to allow a threaded rod to pass therethrough in one direction without the threaded rod rotating, yet can be sufficiently resilient to return to firmly engage the threaded rod and to provide sufficient strength to resist movement of the threaded rod, without buckling, when the threaded rod is loaded in an opposite direction.

In some embodiments, the flexibility and elastic resiliency of the arms 114 enables the spring nut 100 to provide a restorative action, or pre-bias, during insertion of a threaded rod. For example, the arms 114 can flex laterally outwardly as a crest of a thread of a threaded rod that is being inserted through the spring nut 100 passes between free ends of the arms 114. For example, the arms 114 can flex in a direction extending generally perpendicular to a central axis 120 (see FIG. 5). Further, restorative action due to the resiliency of the arms 114 can subsequently return (and further bias) the arms 114 laterally inwardly (e.g., toward the central axis 120 along respective lateral directions) and into gripping engagement with the threaded rod between the passed crest and a subsequent crest of the thread.

In some embodiments, a portion of the arms of a spring nut can be configured to extend into a strut 50 (see e.g., FIG. 12). In the embodiment illustrated in FIG. 5, for example, the arms 114 each include a structure-engagement portion 116, a support portion 118, an angled connecting portion 128, and a thread-engaging portion 130. In particular, the arms 114 extend continuously from connections with a base 122 along the support portions 118, the structure-engagement portions 116, the connecting portions 128, and the thread-engaging portions 130. The first and second arms 114a, 114b define a first width 148 in a first lateral direction between the outermost parts of the connecting portions 128a, 128b.

Figure 5:
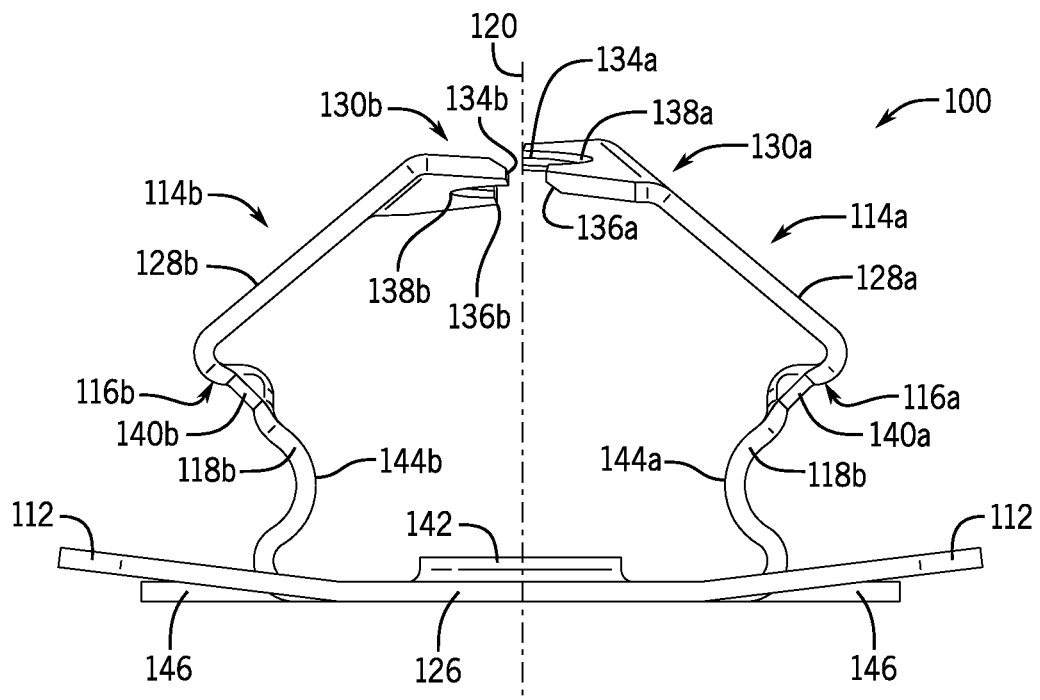
FIG. 5 is front elevation view of the spring nut of FIG. 3.

In some embodiments, the support portions 118 each define an S-shaped profile between the base 122 and the engagement portions 116, as further discussed below. (As used herein, "S-shaped" indicates a body or portion of a body that includes two end portions with two opposite-direction curves therebetween that are linked by a middle section of the body/portion.) Accordingly, from a perspective moving along the arms 114 away from the base 122, the arms 114 initially curve laterally outward, then curve laterally inwardly, and then laterally outwardly again and axially upward at the junction between the structure-engagement portions 116 and the connecting portions 128. The curved configuration creates and defines a plurality of crumple zones 144. As shown in the illustrated embodiment of the spring nut 100 in FIGS. 3 through 6, the crumple zones 144 are formed as curved sections of the support portions 118 having a C-shaped profile as seen in FIG. 5, which in turn forms part of the S-shaped profile that extends along the arms 114 from the base 122 through the crumple zones 144. Generally, the crumple zones 144 curve inward toward (i.e., are convex relative to) the central axis 120, which can reduce the likelihood of interference with the strut 50 when the crumple zones 144 are collapsing. In some embodiments, a crumple zone may include a simple (e.g., smooth and continuously convex) profile between a base and a strut-engagement portion of an arm (e.g., the engagement gussets 140). In some embodiments, a crumple zone may include a more complex profile between a base and an engagement portion of an arm (e.g., an S-shaped profile as generally shown in FIG. 5).

Continuing along the arms 114 from the junction of the support portions 118 and the connecting portions 128, the connecting portions 128 each extend an angle between zero and ninety degrees relative to the central axis 120 (i.e., at an acute angle). In other embodiments, other configurations are possible. For example, whereas the connecting portions 128 are shown as being generally planar, a connecting portion in some embodiments can extend inwardly with a curved or other non-planar profile.

Continuing, the thread-engaging portions 130 extend from junctions with the connecting portions 128 of the arms 114. The thread-engaging portions 130 are generally designed to cooperate to engage and secure a threaded rod that has been inserted through an aperture 124 in the base 122 and between threaded portions 130. Accordingly, for example, the thread-engaging portions 130 can be arranged along a generally helix-like path to conform to a standard thread type on a threaded rod.

In some embodiments, as also discussed below, the thread-engaging portions 130 can exhibit a compound geometry. For example, a first portion of each of the thread-engaging portions 130 can exhibit a first geometry (e.g., as corresponds to a first projected angle of a thread) and a second portion of each of the thread-engaging portions 130 can exhibit a second geometry (e.g., as corresponds to a second projected angle of the thread).

Because the structure-engagement portions 116 of the arms 114 are dimensioned to extend laterally past the reentrant lips 52 of the strut 50, the connecting portions 128 can be urged into contact with reentrant lips 52 as the spring nut 100 is inserted, including via resilient response of the spring nut 100 itself. As a result, for example, as aided by the angled aspect of the angled portion 128, the arms 114 can be caused to flex laterally inwardly during the initial axial insertion of the spring nut 100 into the strut 50. In some embodiments, the thread-engaging portions 130 can be configured to overlap during the laterally inward flexing. The overlapping capability permits the arms 114 of the spring nut 100 to be received through an opening (e.g., between reentrant lips of a strut) without interference between the arms 114, even for relatively small openings. This allows the arms 114 to maintain a closely spaced arrangement after installation to biasingly engage a threaded object therebetween. Once the spring nut 100 is inserted axially far enough into the strut 50, so that the connecting portions 128 of the arms 114 are past the reentrant lips 52, the arms 114 can then resiliently spring laterally outwardly away from the central axis 120, to engage (e.g., snap into engagement) with the strut 50. In some cases, when arms 114 snap into engagement with the reentrant lips 52, the structure-engagement portions 116 can snap over the reentrant lips 52, with the reentrant lips 52 thereby retaining the spring nut 100 within the strut 50 against axial withdrawal.

Continuing, the base 122 of the spring nut 100 extends perpendicularly to the central axis 120. Correspondingly, the aperture 124 through the base 122 is axially aligned with the curved thread-engaging portions 130 so that, for example, a threaded rod can be inserted axially through the aperture 124 and between the thread-engaging portions 130 (as further discussed below).

In the illustrated example, the aperture 124 is surround by a raised feature configured as an extruded, non-threaded annular flange 142 that extends integrally from the base 122, although other configurations are possible. Generally, the flange 142 can provide radial support for the threaded object extending through the aperture 124. In some embodiments, the flange 142 can be configured to extend axially away from the base 122 by at least one pitch of an expected thread.

The base 122 also includes opposing tabs 126, which extend beyond the axially projected envelope of the arms 114 (i.e., the lateral extent of the arms 114 when the spring nut 100 is viewed from the axial direction). In the illustrated embodiment, the tabs 126 extend along a plane defined by the base 122 in a direction perpendicular to the lateral flexing direction of the arms 114, although other configurations are possible. Each of the tabs 126 includes a set of opposing legs 112 that extend laterally beyond the arms 114. The set of legs 112 define a second width 150 in the first lateral direction that is larger than the first width 148 between the arms 114 (shown in FIG. 11).

The base 122 further includes stop tabs 146, which extend outward from the base 122 opposite each other along the plane defined by the base 122 and adjacent the arms 114. The stop tabs 146 are configured to act as a stop against over-insertion of the spring nut 100 into the strut 50, including when the legs 112 are being flexed to allow sliding adjustment of the spring nut 100 relative to the strut 50 (as discussed further below). The stop tabs 146 can reduce the likelihood of bending the legs 112 beyond elastic deformation recovery.

In some cases, engagement features can be included to further enhance engagement between the spring nut 100 and the strut 50. This can be helpful to maintain the position of the spring nut 100 during installation of a threaded rod, especially, for example, if the strut is mounted vertically or horizontally along a vertical structural member. For example, engagement features configured as engagement gussets 140 are positioned in the structure-engagement portions 116 in the illustrated embodiment. It should be noted that the engagement feature may take other forms, including a split gusset (not shown), an elongate notch or inwardly curved recess, or other integrally formed contours or contact areas on an arm. The engagement gussets 140 are configured to provide an edge profile with which to focus the entire spring energy of the arms 114 on a particular, reduced-area region of the reentrant lips 52. The focused spring energy allows the engagement gussets 140 to "bite" into the reentrant lips 52 and inhibit lateral movement (i.e., sliding) along the strut 50. As also discussed below, if lateral movement of the spring nut 100 is desired after installation, the spring energy of the arms 114 may be overcome by urging the spring nut 100 further in the direction of the strut 50 to disengage the engagement flares 140.

Figure 13A:
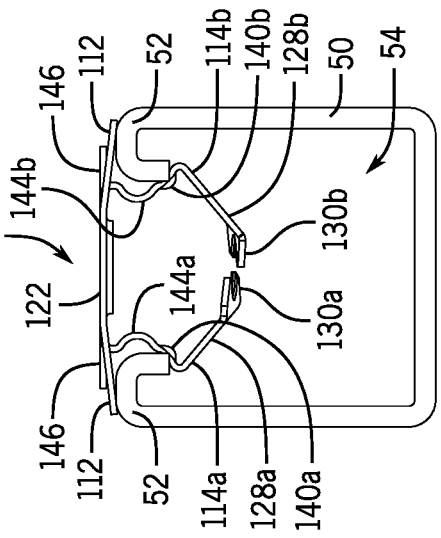
Figure 13B:
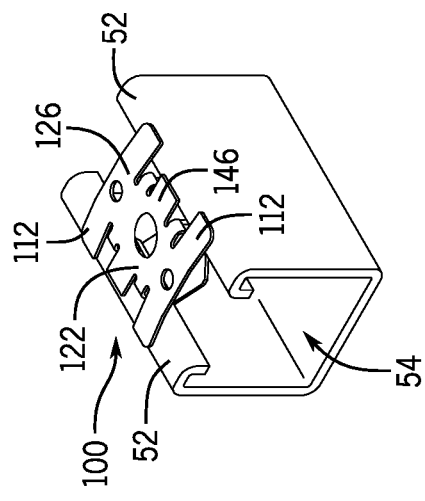

Another example includes a biasing feature configured to urge the base 122 away from the reentrant lips 52 of the strut 50 to better engage the structure-engaging portions 116 with inner surfaces of the reentrant lips 52. For example, in the illustrated embodiment, the biasing feature is provided by the legs 112 being disposed at an angle away (e.g., obliquely angled) from the base 122 and in the direction of the structure-engagement portions 116. The bent legs 112 are configured to induce a biasing force against a strut, regardless of the depth of the strut, to help maintain the position of the spring nut 100 (i.e., to resist sliding of the spring nut 100 along the strut) (e.g., as shown in FIGS. 13A and 13B).

In some cases, this biasing force can be selectively relieved. For example, if it is desired to laterally move the spring nut 100 within the strut 50, a user can urge the base 122 toward the strut 50 to flatten (or partially flatten) the legs 112, to extend at a second angle from the base, different from the first, and thereby disengage (or partly disengage) the structure-engagement portion 116 from the reentrant lips 52 (i.e., "unload" the engagement) (e.g., as shown in FIGS. 14A and 14B). The spring nut 100 can then be more easily slid along the channel 54. Additionally, or alternatively, a user can sometimes strike the spring nut 100 with an object (e.g., a hammer) in the direction of the desired movement along the strut 50 to overcome the engagement of the engagement gussets 140. However, manual engagement to deform the legs 112, including as discussed above, may provide a more controllable or user-friendly adjustment in some cases.

It is contemplated that a biasing feature can be provided in other forms in some embodiments. For example, tabs similar to the opposing tabs 126 could be disposed at an angle away from the base 122 in the direction of the structure-engagement portions 116, with the legs 112 extending within the same plane as the opposing tabs 126 or bent relative to the opposing tabs 126.

Figure 12A:
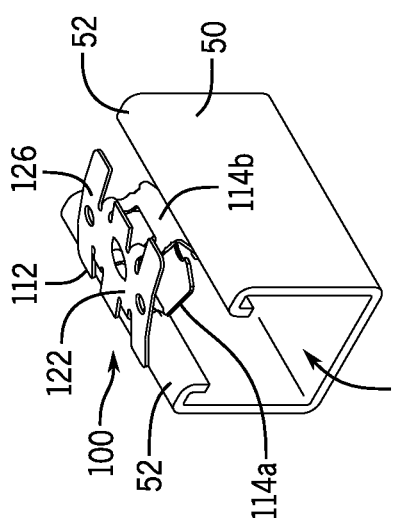
Figure 12B:
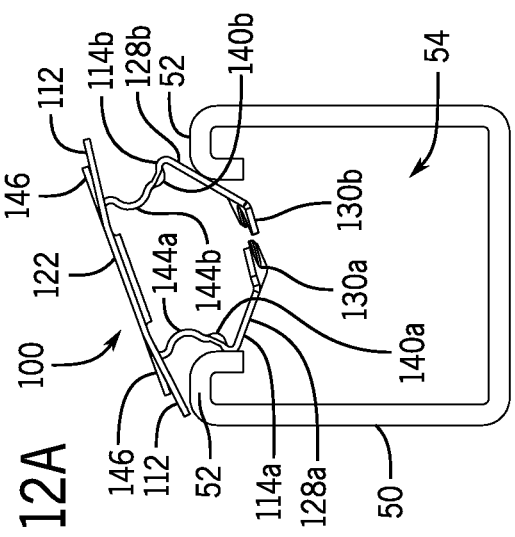

In some embodiments, the above-described snap-in assembly of the spring nut 100 can enable relatively quick assembly and installation of the spring nut 100 on a strut 50, including as illustrated in FIGS. 12A through 14B. For example, as generally illustrated in FIGS. 12A and 12B, the spring nut 100 can "tipped" into the strut 50 by inserting one of the arms (e.g., arm 114a) into the strut 50 with the structure-engagement portion 116a translating along reentrant lip 52a and the angled connecting portion 128a of the other arm 114b translating along reentrant lip 52b while pressure is applied to the spring nut 100 in the direction of the strut 50. The applied pressure and contact with the reentrant lips 52a, 52b urge the arms 114a, 114b toward each other until both arms 114a, 114b are positioned between the reentrant lips 52a, 52b. Continued pressure application moves the arms 114a, 114b further into the strut 50 until the engagement gussets 140a, 140b and the legs 112 are engaged with interior and exterior portions of the reentrant lips 52a, 52b, respectively. The engagement of the engagement gussets 140a, 140b induces opposing biasing forces from the arms 114a, 114b to the reentrant lips 52a, 52b in a lateral direction (in the orientation as shown in FIG. 13B) and the engagement of the legs 112 induces a biasing force to the reentrant lips 52a, 52b in a vertical direction (in the orientation shown in FIG. 13B). The biasing forces load the engagement of the spring nut 100 and the strut 50 to urge the engagement gussets 140a, 140b more tightly into the reentrant lips 52a, 52b and thereby inhibit lateral movement of the spring nut along the strut 50.

Figure 6:
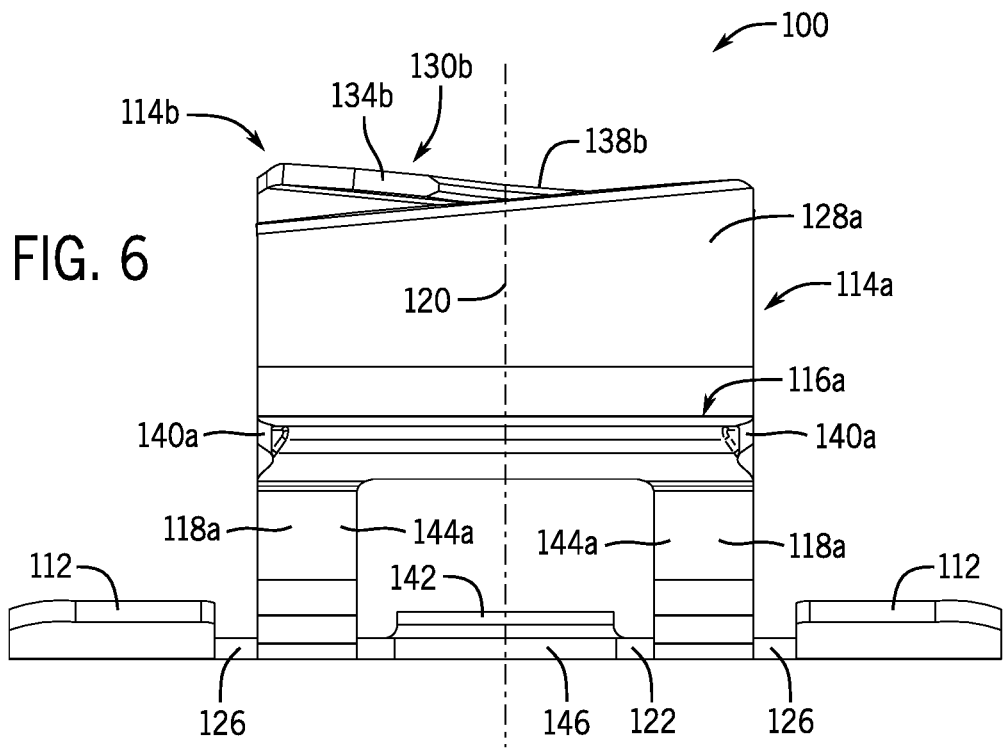
FIG. 6 is a right elevation view of the spring nut of FIG. 3.

Additionally, some embodiments of a spring nut can include thread-engaging portions that are contoured to provide improved engagement with a thread of a threaded object. For example, as shown in FIGS. 5 and 6, the first thread-engaging portion 130a angles generally downwardly toward the base 122 with a first leading edge 134a being arranged axially higher than a first trailing edge 136a (i.e., axially farther from the base 122 than the first trailing edge 136a) at opposite ends of a curved edge 138a. Similarly, the second thread-engaging portion 130b angles generally downwardly away from the base 122, with a second leading edge 134b being arranged axially higher than a second trailing edge 136b at opposite ends of a curved edge 138b. Further, the leading edges 134a, 134b can extend laterally farther from the connecting portions 128a, 128b than do the trailing edges 136a, 136b, and the leading edge 134a is arranged axially higher than the leading edge 134b. In this way, for example, the first and second thread-engaging ends 130a and 130b form a general helix-like profile that is configured to engage a thread on a threaded rod.

The spring nut 100 is also configured to enable relatively quick engagement of a threaded rod therein, including as illustrated in FIGS. 7 through 10, and further shown in FIGS. 15A-16B. In some configurations, a spring nut can be attached to a threaded rod without requiring rotation of the threaded rod and wherein opposite thread-engaging portions of the spring nut can be configured to engage opposite sides of the threaded rod. For example, as shown in FIGS. 7 through 10, the first thread-engaging end 130a is configured to engage one side of a threaded rod 60, with a second thread-engaging end 130b being configured to engage an opposite side of the threaded rod 60.

Figures 7, 8:
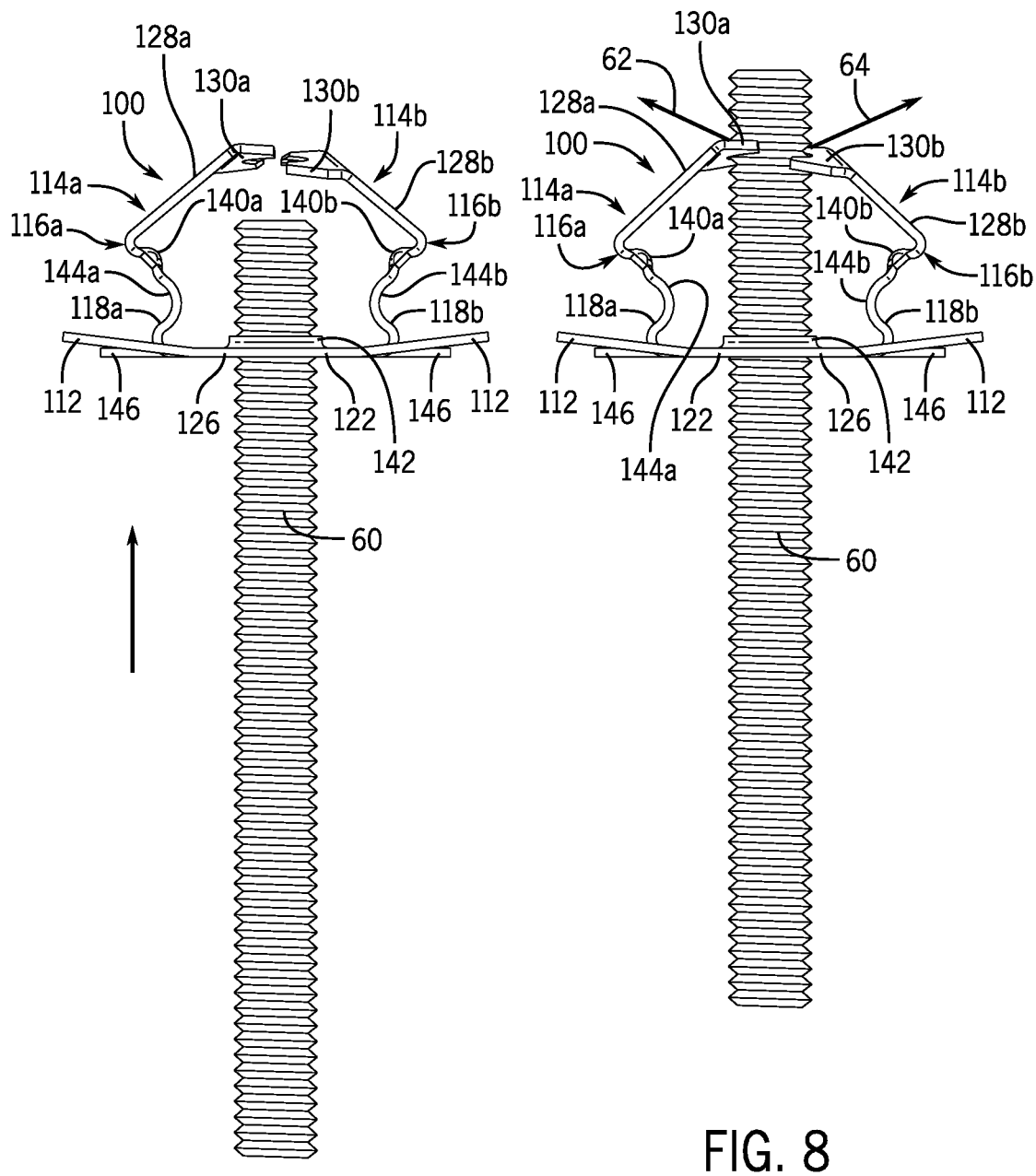
FIG. 7 is a schematic rear elevation view of the arms of the spring nut of FIG. 3 in an initial position when receiving a threaded rod according to an embodiment of the invention.
FIG. 8 is a partially schematic rear elevation partial view of the arms of the spring nut of FIG. 3 moving over a thread when receiving a threaded rod.

In FIG. 7, the spring nut 100 is shown initially being aligned with and pushed onto the threaded rod 60 (or, inherently, vice versa as shown in FIGS. 15A and 15B) so that the threaded rod 60 is inserted through an aperture in a base (shown in FIGS. 3 and 4) of the spring nut 100. This generally positions the threaded rod 60 along the central axis 120 and further aligns the threaded rod 60 to engage the thread-engaging portions 130 of the arms 114.

Figure 9:
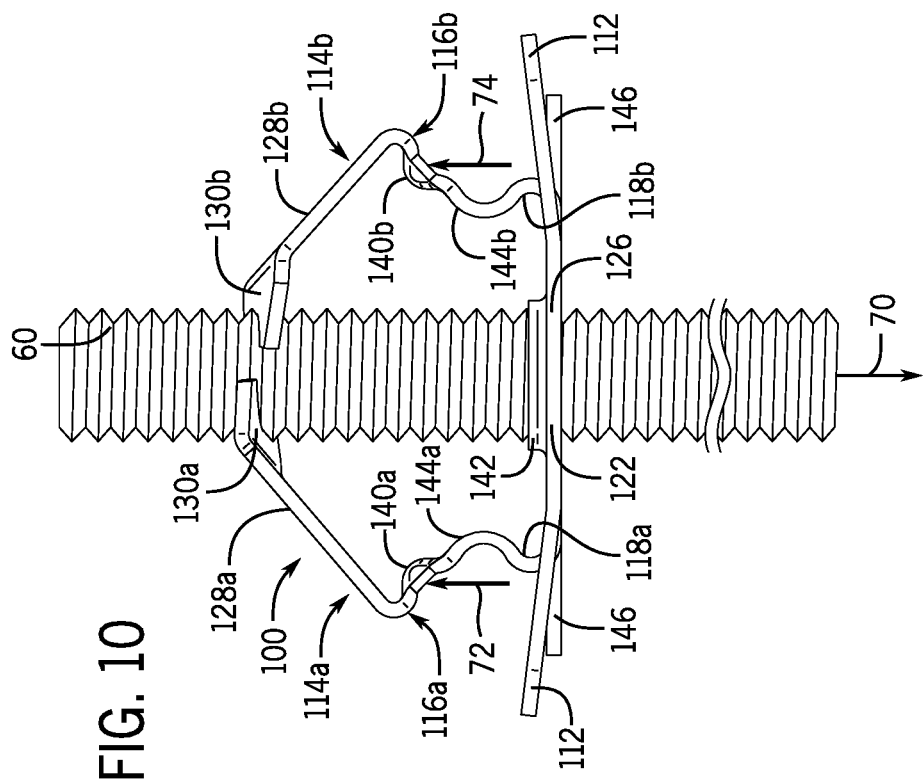
FIG. 9 is a partially schematic rear elevation partial view of the arms of the spring nut of FIG. 3 snapped into a thread when engaging a threaded rod.

As illustrated in FIGS. 8 and 9, once the spring nut 100 has been pushed onto the threaded rod 60 (or vice versa) far enough to engage the threaded rod 60 with the thread-engaging portions 130, the flexibility and design of the thread-engaging portions 130 generally enable arms 114 to flex laterally outwardly to admit the threaded rod 60 through the thread-engaging portions 130 in a first direction (i.e., upward in FIGS. 7 through 10). Further, the arms 114 are configured to resiliently spring laterally inward as each successive crest of the thread of the threaded rod 60 passes the thread-engagement portions 130, in order to automatically engage the subsequent threaded rod 60 between the passed crest and a subsequent crest, and thereby resist withdrawal of the threaded rod 60 in an opposite direction (i.e., downward in FIGS. 7 through 10). As illustrated in FIG. 8 in particular, when the thread-engaging portions 130 are passing over a crest of the thread of the threaded rod 60, the arms 114 can be flexed laterally outwardly (as indicated by arrows 62 and 64 to enable the threaded rod 60 to pass therethrough. As illustrated in FIG. 9 in particular, as a subsequent root of the thread is moved into alignment with the thread-engaging portions 130, the restorative action of the arms 114 moves the thread-engaging portions 130 laterally inwardly (as indicated by arrows 66 and 68) into closer engagement with the thread generally (e.g., at or near the root). As shown in FIG. 16B, and further discussed below, the force of the insertion of the threaded rod 60 in the spring nut 100 that is already installed in the strut 50 urges the arms 114 further into the strut 50 and partially bends the legs 112 closer to planar alignment with the base 122, which increases the biasing force induced by the legs 112 onto the reentrant lips 52.

Figure 10:
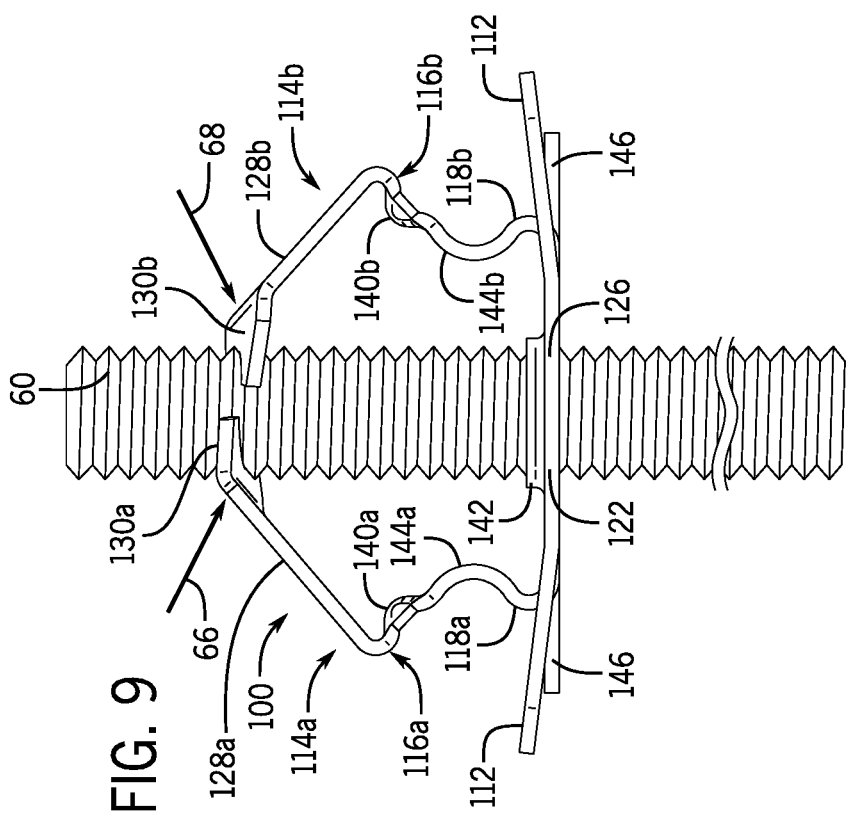
FIG. 10 is a partially schematic rear elevation partial view of the arms of the spring nut of FIG. 3 attached to a threaded rod and a load applied to the threaded rod.
Figure 11:
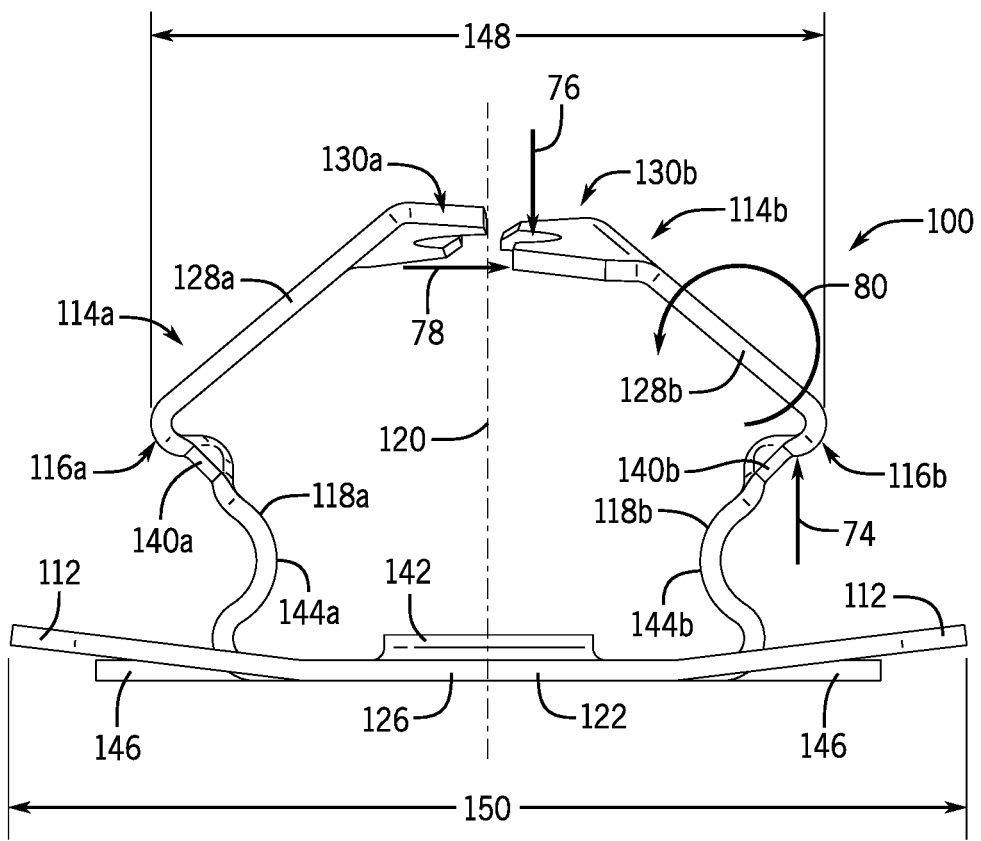
FIG. 11 is a partially schematic rear elevation partial view of the arms of the spring nut of FIG. 3 illustrating certain forces acting on the spring nut.

In some embodiments, as illustrated in FIG. 10, a load applied to the threaded rod 60 in a first, downward direction 70 (from the perspective of FIGS. 7 through 10), such as an axial direction opposite an insertion direction of the threaded rod into the spring nut 100, results in the generally vertical force 76 (shown in FIG. 11 acting on the second arm 114b) applied by the threaded rod 60 to the thread-engaging ends 130. The load can be transferred to the spring nut 100 at the location where the thread-engaging portions 130 engage the thread of the threaded rod 60. The load can then be transferred from the thread-engaging portions 130 along the arms 114 to the engagement between the structure-engagement portions 116 and the reentrant lips 52 when installed in a strut 50 (see, e.g., FIG. 19B). The load applied to the threaded rod 60 can accordingly be counterbalanced by reaction forces 72 and 74 at the engagement between the structure-engagement portions 116 and the reentrant lips 52 of the strut 50. Thus, the load applied to the threaded rod 60 may be transferred from the spring nut 100 to the strut and the strut can support the threaded rod 60 relative to another structure (not shown) to which the strut is attached.

Due to the engagement between the structure-engagement portions 116 and the reentrant lips 52 occurring at a location that is laterally outward from the engagement of the thread-engaging portions 130 with the thread of the threaded rod 60, loading of the threaded rod 60 can generate a reaction moment that generally urges the arms 114 and, in particular, the thread-engaging portions 130, into tighter engagement with the thread of the threaded rod 60. This can generally contribute to the thread-engaging portions 130 being firmly retained in engagement with the thread of the threaded rod 60 and can help to resist, for example, laterally outward forces generated from the angled interaction with the thread on the threaded rod 60. Indeed, with appropriate design (e.g., as illustrated for the spring nut 100), increases in loading on the threaded rod 60 can tend to increase the gripping force of the engagement of the spring nut 100 with the threaded rod 60.

A second moment in an opposite direction of the first moment is also induced on the arms 114 from a horizontal component 78 (shown in FIG. 11 acting on the second arm 114b) of a force generated from the angled interaction of a thread of the threaded rod 60 with the thread-engaging ends 130. With appropriate configuration with regard to the lateral positioning of the contact between the arms 114 and the strut 50 (shown in FIG. 12) or other support structure, the first moment can generally be greater in magnitude than the second moment. Accordingly, a net moment 80 (shown in FIG. 11 with respect to the second arm 114b) can result, which can generally urge the thread-engaging ends 130 into tighter engagement with a thread as the threaded rod 60 is increasingly loaded. In this way, for example, the more the threaded rod 60 is loaded, the more strongly the arms 114 are urged into engagement with the rod 60 and the more strongly the spring nut 100 retains the rod 60 against the load.

It is further contemplated in some embodiments that the tightening or loading of the threaded rod 60 (see FIGS. 7 through 10) within the spring nut 100 can further enhance engagement between the spring nut 100 and the strut 50. For example, the engagement of the engagement gussets 140 can be further increased during the tightening of the threaded rod 60. The direct mechanical force induced by the tightening of the threaded object within the arms 114 concentrates a reactionary force from the strut 50 at the engagement gussets 140 of the spring nut 100. In some embodiments, the enhanced engagement of the engagement gussets 140 can permit the spring nut 100 to carry a load with the force of the load acting in a direction along the length of the strut (i.e., in the lateral direction along the strut), for example, when the strut is installed vertically on a wall.

Additionally, the engagement between the spring nut 100 and the strut 50 can be enhanced (e.g., pre-loaded) by threading a hex nut 40 against the base 122, opposite the strut 50. As shown in FIGS. 18A and 18B, the hex nut 40 can be installed onto the threaded rod 60 until the hex nut 40 abuts the base 122. The hex nut 40 can then be rotated between a quarter-rotation to a full-rotation (e.g., a three-quarter rotation) to flatten the legs 112 relative to the base 122. In some configurations, the flattening of the legs 112 can be used as a visual indication of achieving a predetermined torque value of the hex nut 40 on the threaded rod 60 as it is urged against the base 122 of the spring nut 100.

Further, some embodiments can help to provide enhanced engagement between the spring nut 100 and the strut 50 even though the actual dimension (e.g., height in an insertion direction) of reentrant lips vary from strut to strut. Therefore, the quality of the engagement can also vary unless a fastener is equipped to adapt to the differences in heights. In this regard, for example, as also discussed above, the crumple zones 144 can be provided within the support portions 118. As shown in FIGS. 19A and 19B, for example, the crumple zones 144 are generally configured to partially crumple (i.e., collapse) as the hex nut 40 is tightened against the spring nut 100, to better engage the structure-engagement portion 116 with the reentrant lip 52. In particular, because of the collapsible configuration of the crumple zones 144 (e.g., C- or S-shaped, as shown), as the hex nut 40 is tightened toward the strut 50 the resulting force from the threaded rod 60 on the arms 114 of the spring nut 100 can cause a distance between the base 122 and the engagement of the arms 114 with the threaded rod 60 to decrease (i.e., at least partly due to generally shortening deformation of the crumple zones 144, rather than to the deformation of the connecting portions 128 or of the bends between the connecting portions 128 and the support portions 118.

Figure 20:
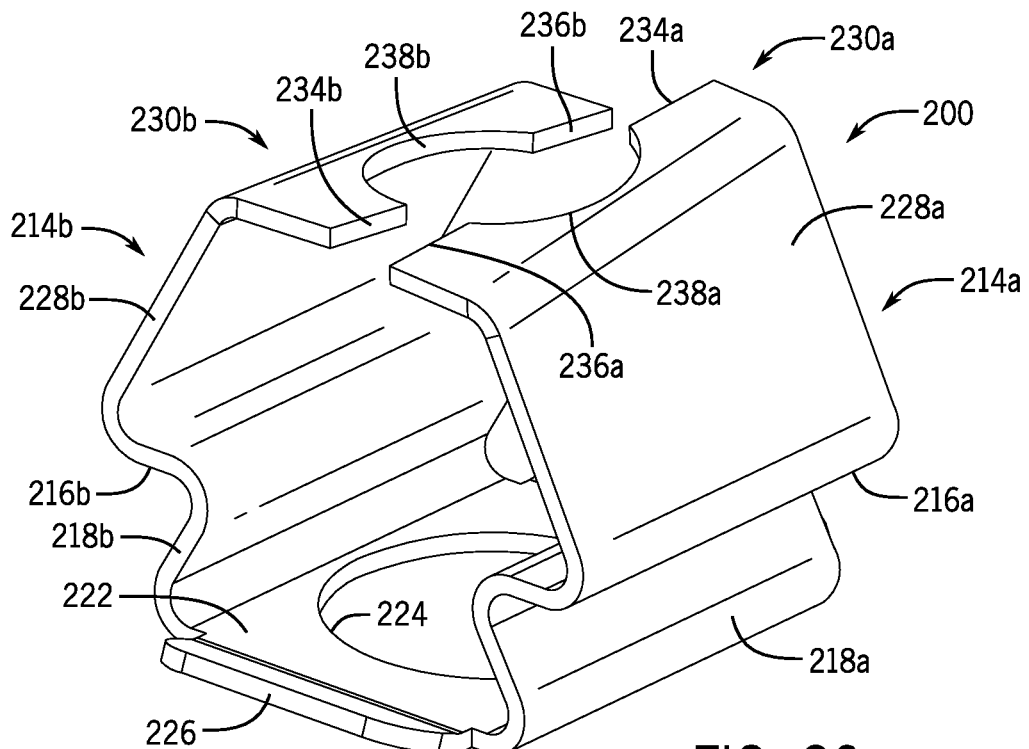
FIG. 20 is a top, front, right isometric view of a spring nut insert according to another embodiment of the invention.
Figure 21:
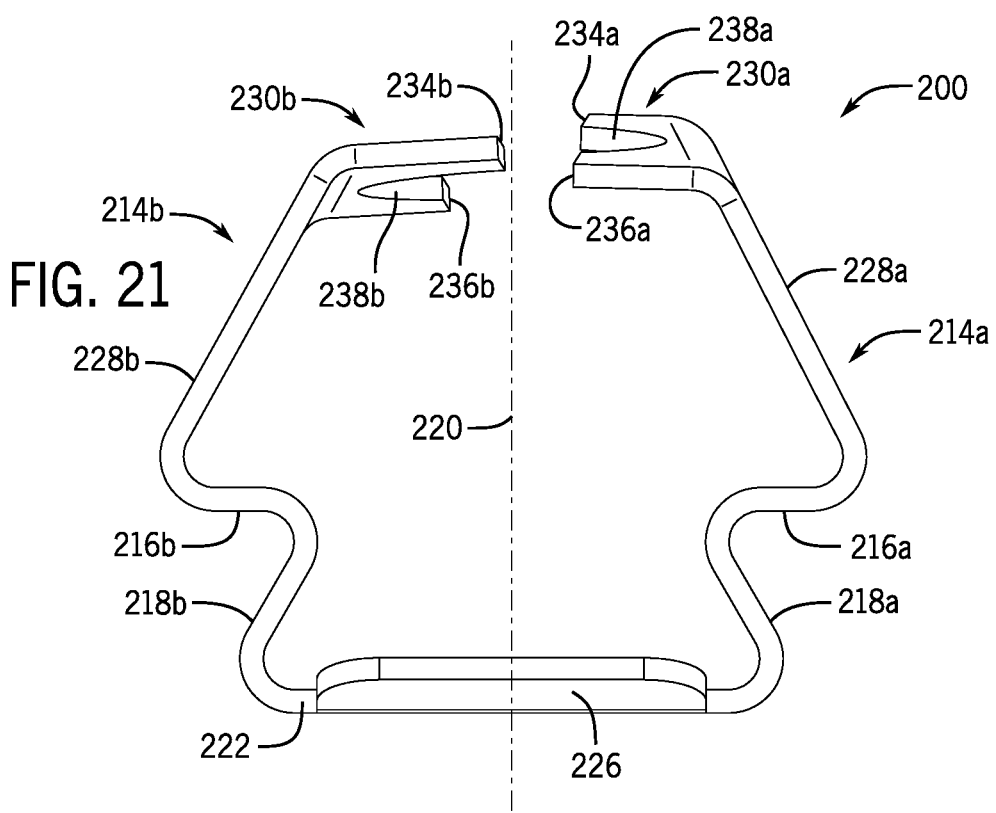
FIG. 21 is a front elevation view of the spring nut of FIG. 20.
Figure 22:
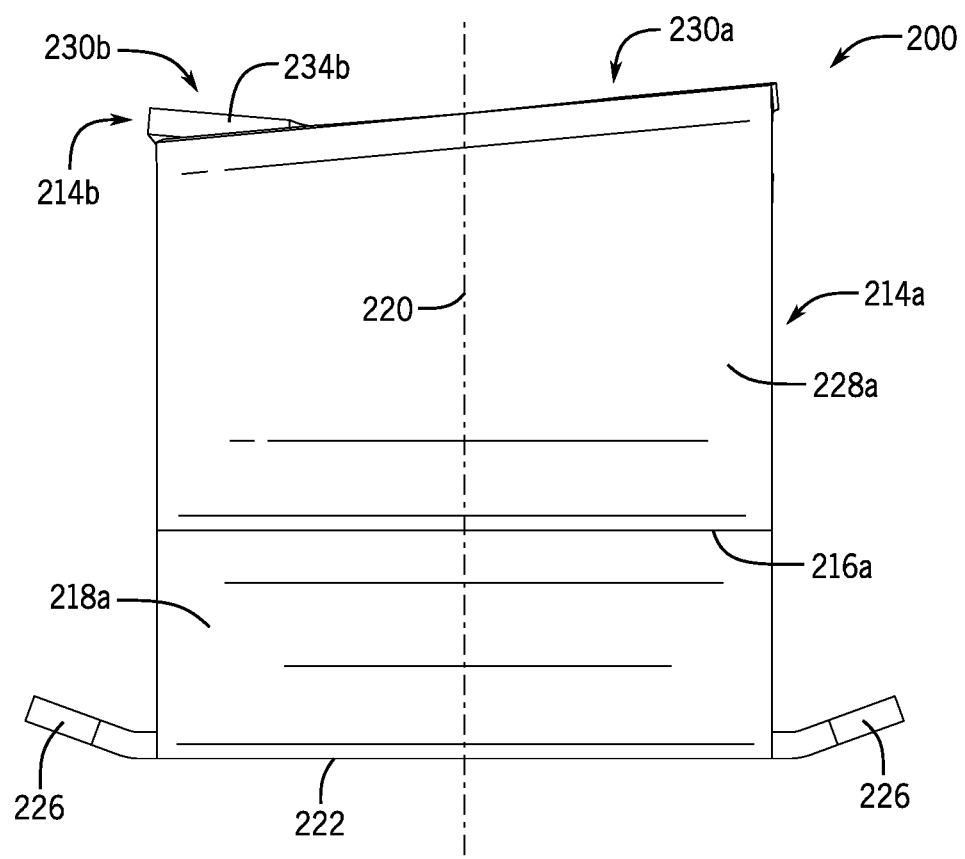
FIG. 22 is a right elevation view of the spring nut of FIG. 20.

FIGS. 20 through 22 illustrate a spring nut 200 according to another embodiment of the invention. In many aspects, the spring nut 200 is configured similarly to the spring nut 100 described above and similar numbering in the 200 series is used for the spring nut 200. For example, the spring nut 200 has a base 222 and arms 214 extending from the base 222 along a central axis 220. The arms 214 each have a support portion 218, a structure engagement portion 216, an angled connecting portion 228, and a thread-engaging portion 230 with a curved edge 238, a leading edge 234, and a trailing edge 236.

In some aspects, however, the spring nut 200 differs from the spring nut 100. For example, although opposing tabs 226 extend from the base 222 outside of the axially projected envelope of the arms 214, the opposing tabs 226 are disposed at an angle away from the base 222 and in the direction of the structure-engagement portions 216. The bent tabs 226, similar to the legs 112 of the spring nut 100, are configured to induce a biasing force against a support structure (not shown) to maintain the position of the spring nut 200 on the support structure.

As discussed above, certain embodiments exhibit features that are different from features of other embodiments. Generally, features described with respect to one embodiment above can be interchanged with features of other embodiments, or added as supplemental features to other embodiments. For example, structure-engagement portions with engagement gussets or support portions with crumple zones as provided with respect to the spring nut 100 can be incorporated into the spring nut 200 or other configurations. Similarly, particular angular configurations, internal features, and other features described above can be generally be included on any variety of embodiments other than those with which such configurations or features are specifically illustrated or described above.

In some implementations, devices or systems disclosed herein can be utilized, manufactured, or installed using methods embodying aspects of the invention. Correspondingly, any description herein of particular features, capabilities, or intended purposes of a device or system (e.g., the spring nuts 100, 200) is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. For example, as shown in FIGS. 12A through 13B, a method of installing a spring nut 100 into a strut 50 is shown. The method can include tipping the first arm 114a into the strut 50 (e.g., rotating the spring nut 100 about a contact point between the strut 50 and one set of the legs 112) so that the joint at which the support portion 118a and the angled connecting portion 128a meet is urged against one of the reentrant lips 52 and the angled connecting portion 128b of the second arm 114b contacts the other of the reentrant lips 52 (shown in FIG. 12A). The spring nut 100 can then be pressed toward the strut 50 (i.e., further into the channel of the strut 50) until the arms 114 are between the reentrant lips 52, the set of legs 112 are in contact with the outer surface of the reentrant lips 52, and the engagement features 140 are urged against the reentrant lips 52 by the biasing force of the arms 114 and the legs 112 against the reentrant lips 52 (as shown in FIGS. 13A and 13B).

Another example method according to the present invention includes moving the spring nut 100 along the strut 50 once installed therein. In reference to FIG. 14A (e.g., after installation according to the method of FIGS. 12A through 13B), the method can include pushing the base 122 of the spring nut 100 in the direction of the strut 50, thereby bending the legs 112 relative to the base 122 to bring the legs 112 into, or closer to, planar alignment with the base 122 (or, alternatively, with a plane defined at the mount of the channel of the strut 50 by the external edges of the reentrant lips 52). As a result of this elastic deformation of the legs 112, pushing the installed nut 100 toward the strut 50 can elastically move the engagement features 140 out of engagement with the reentrant lips 52 (i.e., can relieve the biasing force imposed by the legs 112 as discussed above). Then, with the engagement features 140 thus disengaged (e.g., while maintaining the pushing force on the spring nut 100), the spring nut 100 can be slid along the strut 50 in either direction and into a preferred location. The pressure can then be released and the legs 112 will induce a biasing force onto the reentrant lips 52, reengaging the engagement features 140 to retain the spring nut 100 in the preferred location.

Additionally, an example method for inserting and engaging a threaded rod 60 within the spring nut 100 is shown in FIGS. 15A through 16B. The method can include aligning the threaded rod 60 with the aperture 124 in the base 122 of the spring nut 100 already installed in a strut 50 (shown in FIGS. 15A and 15B, e.g., after installation and adjustment according to FIGS. 12A through 14B). The threaded rod 60 is then urged in the direction of the thread-engaging portions 130, to pass between the thread-engagement portion 130 and generally through the nut 100. Due to the force balances discussed above, this sliding (e.g., non-rotating) insertion of the threaded rod 60 pushes the thread-engaging portions 130 outwardly away from each other. The resilient response (i.e., biasing force) of the arms 114 then maintains the arms 114 in contact with the rod 60 as it continues therebetween and urges the thread-engaging portions 130 into gripping engagement with the threaded rod 60 between the passed crest and a subsequent crest of the thread, to retain the threaded rod 60 and inhibit the threaded rod 60 from moving in the opposite direction.

Further, a method for securing the threaded rod 60 and the spring nut 100 to the strut 50 is also contemplated. For example, according to the invention as shown in FIGS. 17A through 19B, a hex nut 40 can be used to further secure the threaded rod 60 to the spring nut 100 and the strut 50 (e.g., and also generally pre-load the threaded rod 60 for the relevant installation). The hex nut 40 can be threaded onto the threaded rod 60 after the threaded rod 60 has been inserted into the spring nut 100 installed in the strut 50 (e.g., as discussed above). Further, the hex nut 40 can be threaded to a position wherein the hex nut 40 abuts the base 122 of the spring nut 100. Rotating the hex nut 40 further (e.g., by another half to a full rotation) urges the legs 112 into the strut 50 and thereby, as similarly discussed above with respect to FIGS. 14A and 14B, bends the legs 112 into planar alignment with the base 122. The planar alignment can visually indicate to an installer that a sufficient torque has been attained as well as inducing a resilient response in the legs 112 that helps to bias the nut 100 overall into secure engagement.

Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A spring nut for attaching a threaded object to a structure with reentrant lips and a channel, the spring nut comprising:
   a base;
   a first arm extending from the base in a first direction;
   a second arm extending in the first direction from the base opposite the first arm; and
   legs extending laterally from the base, in opposing directions, beyond the first and second arms;
   each of the first and second arms including:
      a support portion that extends from the base;
      a structure-engagement portion that extends laterally outwardly from the support portion to be disposed to engage a reentrant lip of the structure; and
      a thread-engagement portion that extends laterally inwardly from the structure-engagement portion to secure the threaded object against axial loading in a second direction opposite the first direction;
   wherein the support portions of each of the first and second arms includes a crumple zone that is configured to deform upon loading of the threaded object in the second direction to decrease a distance between the base and the thread-engagement portion of the respective first or second arm to cause the structure-engagement portion to be urged into the reentrant lips; and
   wherein each of the legs extend at a first angle from the base, toward the structure-engagement portions, to be disposed to contact an exterior surface of the reentrant lips of the structure when the first and second arms are received in the channel.

2. The spring nut of claim 1, wherein the first and second arms are configured to:
   flex laterally inwardly as the first and second arms are urged past the reentrant lips of the structure and then resiliently spring laterally outwardly, so that the structure-engagement portions are disposed to seat against the reentrant lips;
   with the first and second arms extending into the channel of the structure, flex laterally outwardly to admit the threaded object therebetween in the thread-engagement portions upon non-rotational insertion of the threaded object in the first direction; and
   resiliently spring laterally inwardly to engage the thread-engagement portions with a thread of the threaded object, to secure the threaded object against non-rotational movement of the threaded object opposite the first direction.

3. The spring nut of claim 1, wherein the structure-engagement portion includes engagement gussets arranged to direct spring energy of the first and second arms onto a focused location of a corresponding one of the reentrant lips of the structure; and
   wherein the legs are configured to induce a spring force in the second direction onto the reentrant lips to engage the engagement gussets with the reentrant lips.

4. The spring nut of claim 3, wherein the base is a planar body that defines a base plane; and
   wherein the legs are planar legs that extend obliquely away from the base plane.

5. The spring nut of claim 1, wherein, in a first installed configuration, the structure-engagement portions are configured to engage the reentrant lips to resist sliding adjustment of the spring nut relative to the structure; and wherein, from the first installed configuration, with the first and second arms received in the channel, the legs are configured to be elastically deformed by a force that urges the base toward the structure, to extend at a second angle from the base that is different from the first angle, so that the structure-engagement portions disengage from the reentrant lips to permit sliding adjustment of the spring nut relative to the structure.

6. The spring nut of claim 1, wherein one or more of the crumple zones is formed as a curved section of the respective support portion, including a C-shaped profile.

7. The spring nut of claim 6, wherein each of the support portions includes an S-shaped profile that extends between the base and an engagement feature and includes the C-shaped profile of the crumple zone.

8. The spring nut of claim 1, further comprising:

stop tabs extending outward from the base adjacent the first and second arms;

wherein the stop tabs are configured to contact an exterior surface of the reentrant lips of the structure to provide a stop against over-insertion of the first and second arms into the channel of the structure.

9. The spring nut of claim 8, wherein the stop tabs extend along a base plane defined by the base, separately from the legs.

10. The spring nut of claim 1, wherein the structure-engagement portions include engagement gussets; and wherein, for each of the first and second arms the crumple zone is located between the base and the engagement gusset.

11. A spring nut for attaching a threaded object to a strut with a channel and reentrant lips, the spring nut comprising:

a base;

a first arm integrally extending from the base;

a second arm integrally extending from the base opposite the first arm and configured to engage the threaded object in combination with the first arm, the first and second arms defining a first width in a first lateral direction; and legs integrally extending from the base to define a second width in the first lateral direction that is larger than the first width, the legs disposed at an angle relative to the base to extend in a direction toward structure-engagement portions of the first and second arms, the legs configured to contact an exterior surface of the reentrant lip when installed on the strut;

the first and second arms configured to induce a spring force in a first and second direction, respectively, into the respective reentrant lip to engage the structure-engagement portions with the reentrant lips; and the legs configured to induce a spring force in a third direction onto the reentrant lips, outside the channel of the strut, to engage the structure-engagement portions with the reentrant lips.

12. The spring nut of claim 11, further comprising:

stop tabs extending outward from the base adjacent the first and second arms, between corresponding sets of the legs;

wherein the stop tabs are configured to contact an exterior surface of the reentrant lips of the structure to provide a stop against over-insertion of the first and second arms within the strut.

13. The spring nut of claim 11, wherein each of the first and second arms includes a crumple zone that is movable during installation, upon loading of the threaded object in a direction away from the strut, between an installation configuration and an installed configuration that is at least partially collapsed relative to the installation configuration.

14. The spring nut of claim 13, wherein one or more of the crumple zones is included in an S-curve region of the respective first or second arm that extends from the crumple zone to the base.

15. A spring nut for attaching a threaded object to a strut with first and second reentrant lips, the spring nut comprising:

a base with an aperture that defines a base plane;

a set of arms, including a first arm that extends from a first side of the base and includes a first engagement gusset with a first edge profile configured to engage the first reentrant lip and a second arm that extends from a second side of the base opposite the first side and includes a second engagement gusset with a second edge profile configured to engage the second reentrant lip, the first and second arms being laterally spaced relative to a central axis on which the aperture is centered; and a set of legs extending from the base, obliquely relative to the base plane, including a first leg that extends from the first side of the base in a direction toward the first arm and a second leg that extends from the second side of the base in a direction toward the second arm;

the first and second arms being configured to biasingly engage the first and second reentrant lips, respectively, internal to the strut; and the set of legs being configured to biasingly engage the first and second reentrant lips external to the strut to further urge the first and second arms into engagement with the first and second reentrant lips.

16. The spring nut of claim 15, wherein the set of legs further includes a third leg extending from the first side of the base, parallel with and on an opposing side of the first arm from the first leg, and a fourth leg extending from the second side of the base, parallel with and on an opposing side of the second arm from the second leg.

17. The spring nut of claim 16, wherein a portion of each of the first and second arms that extends laterally outwardly from the base includes a crumple zone, the crumple zone configured to at least partially collapse when the first and second arms are engaged with the first and second reentrant lips and the threaded object is loaded against the first and second arms to shorten a distance between the base and a distal end of the respective first or second arm that engages the threaded object.

18. The spring nut of claim 17, wherein the crumple zone is included in an S-curve region of the respective first or second arm that extends between the base and a strut-engagement portion of the first or second arm that is configured to engage the corresponding first or second reentrant lip to secure the spring nut against sliding along the strut.

19. The spring nut of claim 15, further including a set of stop tabs extending from the base and along the base plane, the stop tabs configured to contact exterior surfaces of the first and second reentrant lips to provide a stop for insertion of the spring nut into the strut.

\* \* \* \* \*